(No Model.) 3 Sheets—Sheet 1.

M. S. HENRY.
SEEDER.

No. 496,782. Patented May 2, 1893.

Witnesses
Jas. K. McCathran
John M. Diggers

Inventor
Marcus S. Henry
By his Attorneys,
C. A. Snow & Co.

(No Model.) 3 Sheets—Sheet 2.

M. S. HENRY.
SEEDER.

No. 496,782. Patented May 2, 1893.

Witnesses
Jas. K. McCathran
John M. Siggers

Inventor
Marcus S. Henry
By his Attorneys,
C. A. Snow & Co.

(No Model.) 3 Sheets—Sheet 3.

M. S. HENRY.
SEEDER.

No. 496,782. Patented May 2, 1893.

Figure 5:
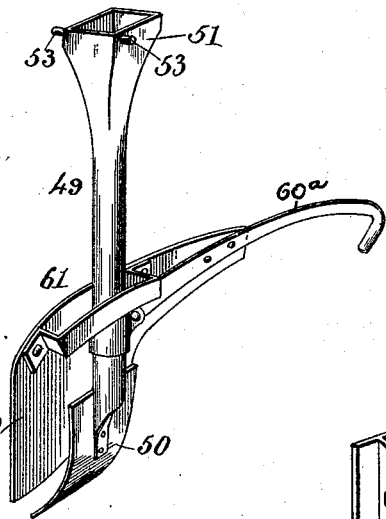

*Fig. 5.ª*

*Fig. 5.ᵇ*

Witnesses
Jas. K. MᶜCathran
John H. Siggers

Inventor
Marcus S. Henry
By his Attorneys,
C. A. Snow & Co.

UNITED STATES PATENT OFFICE.

MARCUS S. HENRY, OF MINNEAPOLIS, KANSAS.

SEEDER.

SPECIFICATION forming part of Letters Patent No. 496,782, dated May 2, 1893.

Application filed October 7, 1892. Serial No. 448,130. (No model.)

*To all whom it may concern:*

Be it known that I, MARCUS S. HENRY, a citizen of the United States, residing at Minneapolis, in the county of Ottawa and State of Kansas, have invented a new and useful Seeder, of which the following is a specification.

My invention relates to improvements in seeders, and the objects in view are to provide a machine so constructed as to plant seed of various kinds either broadcast or in drills and at the same time to thoroughly cultivate or harrow the soil, cover the seed, and form ridges.

Various other objects and advantages of the invention will appear in the following description and the novel features thereof will be particularly pointed out in the claims.

Figure 1:
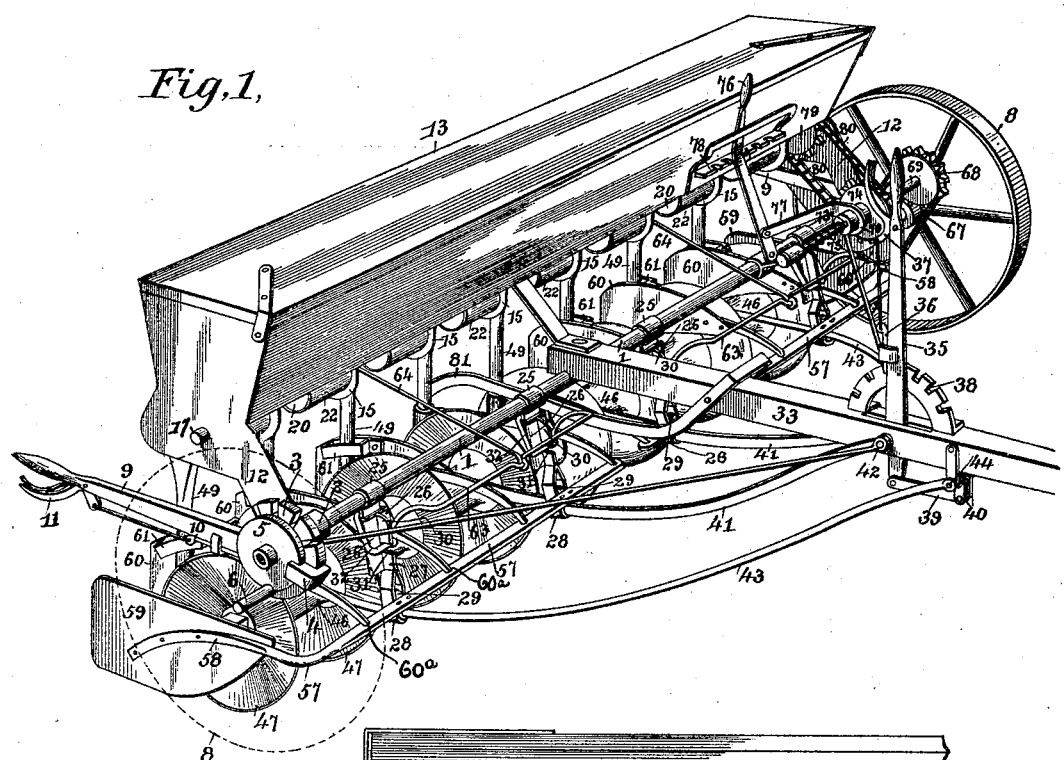
Figure 2:
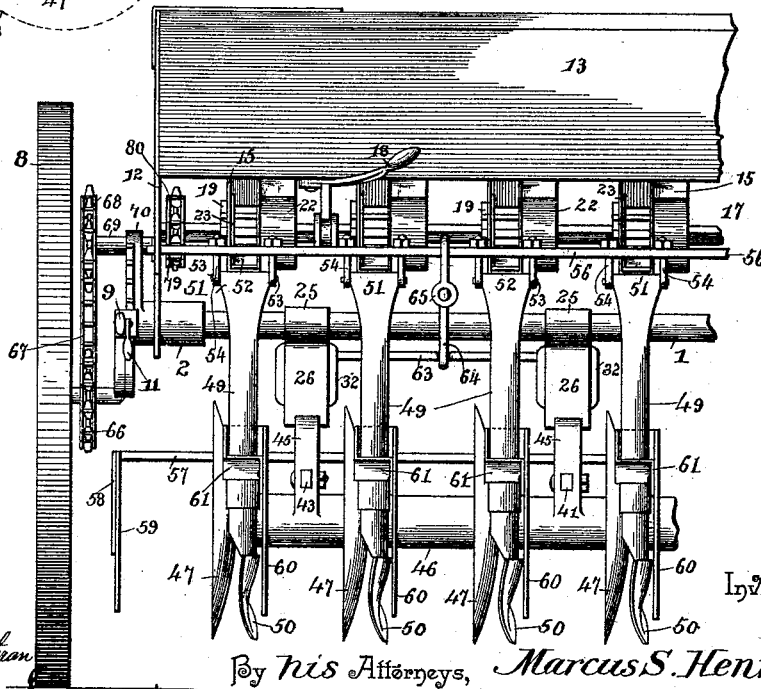
Figure 3:
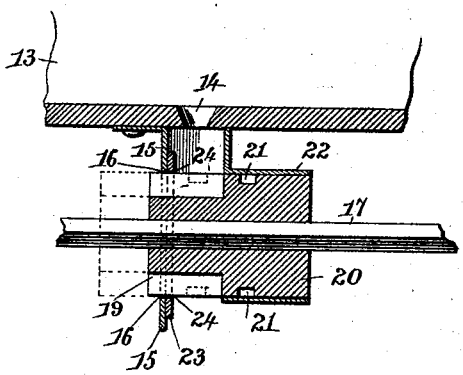
Figure 4:
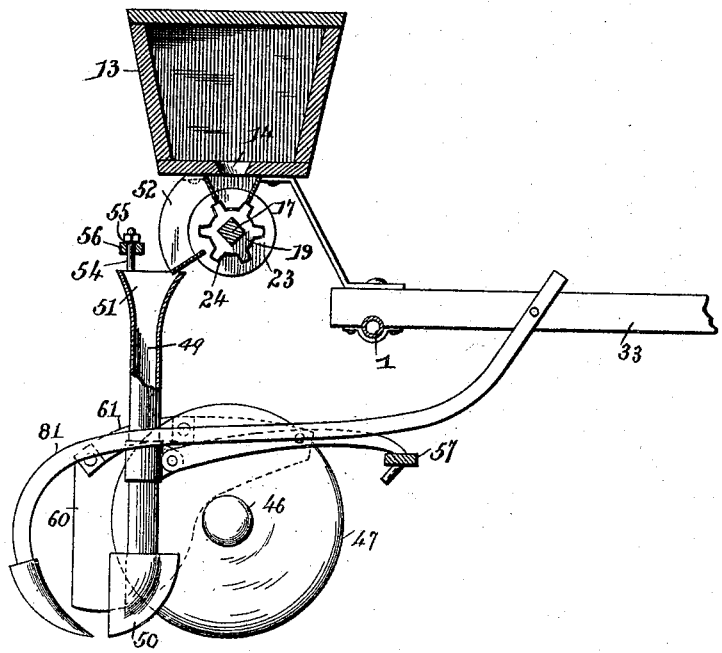
Figure 6:
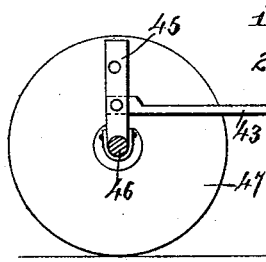
Figure 6:
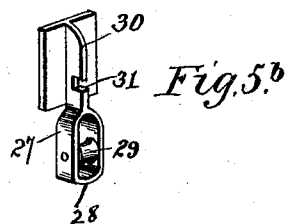
Figure 6:
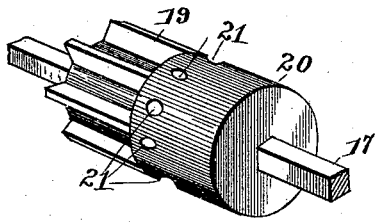

Referring to the drawings:—Figure 1 is a perspective view of the machine. Fig. 2 is a rear elevation thereof. Fig. 3 is a transverse section through one of the seed cups. Fig. 4 is a longitudinal section through the hopper and one of the seed-cups. Fig. 5 is a detail in perspective of one of the seed tubes and its fender. Fig. 5$^a$ is a detail sectional view. Fig. 5$^b$ is a detail of the T-shaped plate. Fig. 6 is a perspective view in detail of the feed shaft, disk and follower.

Like numerals of reference indicate like parts in all the figures of the drawings.

1 designates a transverse main shaft which extends throughout the width of the machine, and the same terminates in, or has secured at its ends, sockets 2, whose outer ends are provided with substantially circular or segmental notched flanges 3, provided at their lower sides or edges with L-shaped keepers 4. Pivoted to each of these flanges, and located at the outer sides thereof, are disks 5 each of which carries an eccentrically located spindle 6, which accommodates ordinary ground wheels 8. Each disk is further provided with a hand lever 9 that carries a locking pawl 10, designed to engage with the teeth of the flanges and operated by a bell crank lever 11 pivoted to the hand lever. It will thus be seen that by a manipulation of the hand lever the machine may be raised and lowered, all for a purpose hereinafter apparent.

Standards 12 rise from the transverse main shaft and support at their upper ends a transversely-disposed hopper 13, which is provided at intervals with circular seed openings 14. At intervals the under side of the hopper has secured thereto depending cups 15, each of which is provided with a circular opening 16. A transverse shaft 17 is journaled in the cups, and is also capable of slight adjustment, which is accomplished through the medium of a small hand-lever 18 fulcrumed near one end of the hopper, though other means may be employed, if preferred. Upon this feed shaft, which is square in cross-section, there is located below each seed opening in the cup a notched or fluted seed wheel 19 and a disk or follower 20, the latter being provided at intervals with peripheral seed-receiving indentations 21. By adjusting the aforesaid feed shaft the series of seed wheels are capable of discharging simultaneously a number of seed or they may be brought farther under the seed openings and act as cut-offs for the same, or the seed disks may be brought under the seed openings and serve to deliver a varying quantity of seed at a time, all as will be obvious. The seed disks are covered upon their inner sides with housings or extensions 22 of the cups. Interposed between the inner edges of the housings and the cups are rotatable plates 23. These plates or rosettes are circular and are provided with openings 24, that fit loosely the ribs or flutes of the seed wheels that though the plates are designed to revolve with the wheels, yet the wheels are capable of sliding in and through the plates, whereby more or less of their peripheries may be exposed to the seed opening, and consequently a greater or less number of seed be simultaneously accommodated in the recesses of the wheels.

From the transverse shaft 1 there depend at intervals hangers 25, whose front faces are provided at opposite edges with ways 26. T-shaped plates 27 are mounted for loosely sliding in the hangers, and at their lower ends are preferably provided with stirrups 28, in each of which above its end is loosely journaled a friction roller 29. The upper ends of the plates are rounded at their front edges, as indicated at 30, and below the same notches 31 are formed therein. Link-shaped latches 32 are loosely suspended from the upper ends of the standards, and at their lower ends are designed to engage with the aforesaid notches of the plates, all as best shown in Figs. 1 and 5ª of the drawings.

33 represents a draft pole or tongue and the same has fulcrumed thereon a hand lever 35 carrying a locking pawl 36 operated by a bell crank lever 37, said locking pawl being designed to engage with a notched locking standard 38. The lower end of the lever which extends below the draft pole or tongue is pivotally connected by means of a loose link 39 with a pair of pivotal straps 40 depending from the tongue or draft pole. Rigid draft bars 41 are mounted in the inner pair of stirrups 28 above mentioned, and have their front ends pivotally connected at 42 to the draft pole or tongue. In the outer stirrups 28 a pair of curved draft bars 43 are loosely mounted, and have their front ends pivotally connected at 44 to the pair of straps before mentioned. Each of these draft bars passes to the rear of the machine and is there pivotally secured to knees 45, whose lower ends are provided with bearings and accommodate a pair of transverse shafts 46. The said shafts 46 accommodate that is, have journaled thereon a series of harrow disks 47 of concavo-convex shape, and which have their convexed sides disposed inward. A series of seed tubes 49 are located in rear of the furrow-disks of the machine, and at their lower ends terminate in deflected mold-boards 50 at the convex sides of the harrow disks. Each of these seed tubes has its upper end provided with a flared mouth 51, that is, an extension of the cup which is directly in rear of the lip 52, which is located at each of the seed openings of the hopper and at one side of the cups that depend therefrom. The seed tubes are further provided at their upper ends and at opposite sides with trunnions 53, which take into the series of eyes at the lower ends of a series of pairs of eye-bolts 54. The upper ends of these eye-bolts are mounted in adjusted openings 55 formed in a transverse seed tube supporting shaft 56, whose ends are secured in the standards 12 that support the hopper 13. It will thus be seen that the seed tubes are pivoted as well as adjusted in position and hang loosely in rear of the seed cups. A pair of bails 57 are mounted on the draft bars and have their outer ends rearwardly bent forming arms 58, each of which carries a fender 59. These bails are perforated at intervals, and at the convex side of each of the disks there is mounted a fender 60, whose front end is extended forward and rigidly engages with the links 60ª, whose front ends engage loosely with the bails. Each fender is provided at its inner side with a keeper 61, that loosely receives the seed tube, so that as will be seen, each seed tube is located between a fender and a disk.

Each pair of latches 32 is connected by a bail 63, and each bail has connected to its center an operating rod 64 which extends in rear of the machine and terminates in a handle 65. By drawing the rods to the rear the link latches are disengaged from the notches of the T-shaped plates so that as will be seen the gangs or disks are free to rise and fall with the undulations of the soil.

One of the spindles or stub-axles 6 carries a sprocket-wheel 66 that moves with the ground wheel, and the same is connected by a sprocket chain 67 with a sprocket wheel 68 that is mounted on a countershaft 69 journaled in a pair of bearing brackets 70 that extend forward from the transverse shaft 1. This countershaft 69 is provided with a feather or spline 73 and also carries a loose sprocket wheel 74, that is normally pressed into engagement with the feather, and consequently made rigid with the countershaft by means of a coiled spring 75, interposed between said sprocket wheel and the inner bracket of the pair that support the shaft. A hand lever 76 is fulcrumed on one of the brackets, and a link 77 connects the same pivotally with the loose sprocket wheel. This hand lever extends upward in front of the hopper, and can be locked in any desired position by a notched locking standard 78. A sprocket wheel 79 is mounted on the seed shaft, and a chain 80 connects the same with the loose sprocket of the countershaft.

To avoid the necessity of employing a fender between the two inner seed tubes of the gangs, I pivotally connect to the tongue or draft beam a standard or tooth 81, which extends rearwardly between the two inner seed tubes, and is designed to deflect the soil in opposite directions.

It will thus be seen that I have provided a machine of cheap and simple construction, adapted to simultaneously cultivate or harrow the ground, form the furrow, drop the seed, and recover the same forming ridges.

Through the medium of a lever fulcrumed on the tongue or draft pole and the draft bars connecting the same with the gangs of disk harrows, the aforesaid disk-harrows may be swung in opposite directions, and thus adjusted with relation to each other and with them the series of fenders and seed tubes, all of which are simultaneously operated by the same lever. By means of the end levers the gangs of harrow disks together with the seed tubes and fenders may be raised clear of the ground, or dropped to any degree of penetration that may be found desirable. When the mechanism is thus raised the machine may be transported from point to point like an ordinary sulky; and when the mechanism is lowered the connections are such as will permit the harrows, seed tubes, and fenders to penetrate the ground to a suitable depth uniformly, regardless of any undulations over which the ground wheels may ride during the operation of the machine.

Through the medium of the link latches the bars may be locked in an elevated position, which locking will be automatic upon the raising of said mechanism. Through the medium of the shifting lever the movement of the seed disks may be arrested, and thus readily thrown into and out of operative connection with the sprocket wheel on the ground wheel.

In the operation the seed are dropped by the feed-wheels into the seed tubes or drills and deposited in the furrows formed by the mold boards, which formation of the furrows is facilitated by the disks that immediately precede them. The mold boards are of such shape as to return the soil to the furrows, and the fenders following after form the soil into ridges, all as will be obvious.

It is designed to detach the seeder from the disks when desired and use the rest of the machine as a harrow; and I wish it understood that the machine may be used either as a combined seeder and harrow or as a harrow alone.

Changes in the form, proportion, and the minor details of construction may be resorted to without departing from the principle or sacrificing any of the advantages of this invention.

Having described my invention, what I claim is—

1. In a machine of the class described, the combination with the framework and a superimposed hopper, of opposite gangs of harrow disks, a series of seed tubes depending from the hopper adjacent to each disk and in rear of the same and terminating at their lower ends in mold boards, and a series of fenders loosely connected with the tubes and extending in rear and at the side of the same, substantially as specified.

2. In a machine of the class described, the combination with a transverse shaft, standards rising therefrom, a superimposed hopper having seed openings, a series of cups in which the cut-offs or disks are mounted under the openings, and means for operating the seed-cylinder, of a series of seed tubes depending from the cups and terminating at their lower ends in mold boards, opposite gangs of harrow disks located at the sides of the seed tubes and in advance of the same, a draft tongue secured to the main shaft, knees rising from the shafts of the harrow disks, draft bars loosely connected at their rear ends to the knees and pivotally connected at their front ends to the tongue, and fenders loosely connected to the seed tubes at the opposite sides thereof at which the disks are located, and a lever for swinging said gangs, substantially as specified.

3. In a machine of the class described, the combination with a transverse shaft, a superimposed hopper, a draft tongue supported upon the shaft, cups depending from the shaft, bails loosely connected to the cups and adapted for vertical movement therein, and means for locking the bails in an elevated position, of a pair of harrow disk gangs in rear of the bails, a series of fenders mounted on the bails, a series of seed tubes depending from the cups between the disks and fenders and loosely connected to the latter, and a series of draft bars loosely connected to the shafts of the gangs, and at their front ends to the tongue, substantially as specified.

4. In a machine of the class described, the combination with the transverse main shaft, the tongue, the superimposed hopper, the series of brackets having ways depending from the transverse shaft, T-shaped plates mounted in the ways and terminating at their lower ends in stirrups, inner and outer pairs of draft bars loosely mounted in the stirrups, the inner pair being pivoted to the tongue, straps pivotally connected to the tongue and at their lower ends to the outer draft bars, a lever for swinging the straps of opposite gangs of harrow disks, the shafts of which are loosely connected with the rear ends of the draft bars, transverse bails mounted on the draft bars, a series of fenders loosely connected at their front ends to the bails and at their rear ends extending beyond the harrow disks, notches formed in the stirrups, link latches loosely depending from the brackets and adapted to engage the notches, means for raising the latches, and a series of seed tubes depending from the cups between the disks and the fender, substantially as specified.

5. In a machine of the class described, the combination with a transverse shaft terminating at its ends in segmental toothed flanges, disks pivoted to the flanges and provided with levers carrying locking pawls for engaging the flanges, spindles depending from the disks, ground wheels journaled on the spindles, a sprocket wheel secured to one of the ground wheels, of superimposed cups, a feed shaft therein having a sprocket wheel, a countershaft supported on the main shaft and provided with a spline, a rigidly mounted sprocket wheel at the outer end of the countershaft, a sprocket chain connecting the same with that sprocket wheel connected to the ground wheel, an adjustable loose sprocket wheel on the countershaft adapted to engage the spline a chain connecting the same with the sprocket wheel of the feed shaft, a spring for normally throwing the loose sprocket wheel into engagement with the spline, and a lever fulcrumed adjacent to the countershaft loosely engaging the same, and means for locking the levers, substantially as specified.

6. In a machine of the class described, the combination with the framework, superimposed cups, a perforated bar arranged below and in rear out of line with the cups, of seed-cylinders located in the cups, eye-bolts located in and depending from the perforated bar, and a series of seed-tubes provided with trunnions at their rear upper corners engaging said eye-bolts and extending forward under the cups, and provided at their lower ends with mold-boards, substantially as specified.

7. In a machine of the class described, the combination with the framework, a hopper mounted therein and provided with seed cups having openings, of a feed shaft journaled below the hopper, in the cups a feed wheel and a feed disk mounted opposite each opening, means for adjusting the shaft, and a seed tube located in rear of the opening and adapted to receive seed from either the disk or wheel, substantially as specified.

8. In a machine of the class described, the combination with the framework, the hopper, and cups having seed-openings, the feed-cylinders mounted in the cups and provided with flutes and orifices, and means for adjusting said cylinders, of a shaft passing through the cylinders and cups, rosettes located in said cups and receiving the cylinders, and spouts located under the cups, substantially as specified.

9. In a machine of the class described, the combination with the hopper having seed openings, of seed cups and tubes below the same, bails in front of the tubes, fenders at the sides of the tubes, and links connected loosely to the bails and to the tubes and rigidly between their ends to the fenders, substantially as specified.

10. In combination with the framework, the convex harrow disks 47, the tubes 49 terminating at their lower ends in deflected mold boards 50 at the convex side of the disks, and the fenders 60 loosely coupled to the tube 49 and arranged alongside of the mold boards, as set forth.

In testimony that I claim the foregoing as my own I have hereto affixed my signature in the presence of two witnesses.

MARCUS S. HENRY.

Witnesses:
J. W. SMITH,
E. M. MORRIS.